Nov. 30, 1965  J. HENRY-BAUDOT  3,221,196
ASYNCHRONOUS MOTOR ARMATURE
Filed Aug. 12, 1960

Inventor
Jacques Henry-Baudot
By Kenyon, Palmer & Stewart
Attorneys

United States Patent Office 3,221,196
Patented Nov. 30, 1965

3,221,196
ASYNCHRONOUS MOTOR ARMATURE
Jacques Henry-Baudot, Antony, France, assignor to Societe d'Electronique et d'Automatisme, Seine, France
Filed Aug. 12, 1960, Ser. No. 49,246
Claims priority, application France, Feb. 25, 1960, 819,799
9 Claims. (Cl. 310—268)

The present invention relates to improvements in asynchronous motors of the type disclosed in my co-pending application No. 761,144 filed September 15, 1958 (now Patent No. 3,060,337), and more particularly to improvements in the armatures of the squirrel cage type described in said application.

According to said application, an axial airgap type of asynchronous motor is formed of a stator comprising a printed-circuit winding affixed over a magnetic ring substantially free of eddy current, and a rotor of such a structure as to substantially operate as squirrel cage rotors in conventional machines.

According to said application further, a rotor is described which comprises a disk-shaped member made of a spiralled magnetic band which had been previously so indented or notched that, in the spiralled member, such indentures define a plurality of hollow ducts of substantially though not definitely radial orientation between two peripheral depressions, and a conductive material of lower resistivity and non-magnetic properties fills said ducts and depressions. In such a structure of a squirrel-cage armature, the overall resistance is conveniently low for a satisfactory driving torque and the conductive and non-magnetic pattern defines a plurality of preformed paths for the circulation of eddy currents therein. As the magnetic airgap of the machine remains narrow, the efficiency of the machine is unaffected by such a structure of rotor.

This however entails some drawbacks from the practical point of view. In order not to complicate the indenture or notching of the magnetic band, a uniform step of indenture is maintained and, from the spiralling, there results in the complete member an appreciable loss of useful area of the conductive paths, viz. those parts of the conductive pattern which are in dead ends in said pattern. To provide for a progressively variable pitch of the indenture would clearly greatly complicate the manufacturing of the armature, both for designing and machining it. Not only the magnetic to non-magnetic ratio of areas on the annular pattern must be predetermined but the pitch of indenture must be so chosen as to produce conductive paths varying substantially from the radial direction and of substantial lack of uniformity therearound, otherwise spurious harmonic effects will be introduced in the operation of the machine.

For eliminating such drawbacks, the present invention provides a new armature design characterized in that separate magnetic inserts are irregularly distributed within a body of conductive material of non-magnetic properties, said inserts extending from the airgap face of the member through at least part of the thickness of the said body; the distribution of the inserts will be said to be aleatory in a sense which will be better defined hereinunder.

Such an armature member may be made by several processes: either for instance by perforating an integral or solid disk of conductive non-magnetic material and introducing magnetic inserts into the holes so formed. Or the armature may be formed by machining a disk of magnetic material (either integral or made of a spiralled ribbon) to provide upstanding protrusions or spikes on one face thereof, and by filling the space between the protrusions with non-magnetic conductive material, said machining being either mechanical or chemical or electrochemical as may be required for such filling. The second process seems preferable as it ensures a better mechanical strength of the armature member.

The geometrical shapes of the inserts may be varied at will as well as their own dimensions, even in a single member, but obviously, it is desirable to form them with simple configurations, such as for instance circular or sectoral ones, in order to facilitate the predetermination of the ratios of surface and volume of the two materials used in the member.

Since such a member is shaped as a ring or circular disk, it is normal, though not imperative, to distribute the inserts along several concentric circles or circular arrays. For obtaining the above-mentioned aleatory distribution, it will then suffice to form the arrays in numbers of inserts which are not divisible by each other from circle to circle of distribution.

The invention is illustrated in the accompanying drawing in which.

Figure 1:
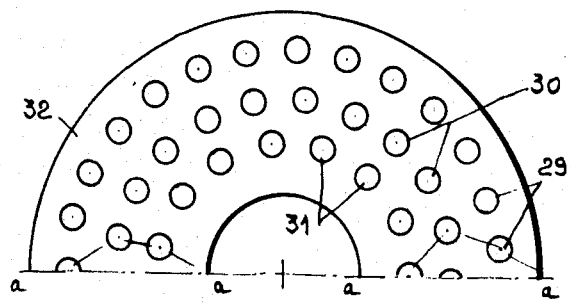
FIG. 1 is a partial front view of an armature member made according to the invention.

In the view of FIG. 1, which shows the airgap face of the rotor armature, three rows of magnetic inserts 29, 30 and 31 are illustratively shown distributed over the surface of the conductive and non-magnetic material 32. The inserts are of circular transverse shape and have substantially identical areas; as said, this is not imperative and for instance, their transverse areas may be progressively enlarged from the inner to the outer circles of distribution over the member, so that in any annulus the ratios of surface between copper (32) and iron (29, 30, 31) remain substantially the same. The distribution of the magnetic inserts is aleatory (or at least semi-aleatory) in that the external circle or array is made of 27 elements (3 times nine), the middle circle, of 21 elements (3 times seven) and the inner circle, of 15 elements (3 times five), the numbers 9, 7 and 5 being numbers which are not multiples of one another. Of course this particular distribution is only illustrative as well as the circular area or form of each insert.

Figure 2:
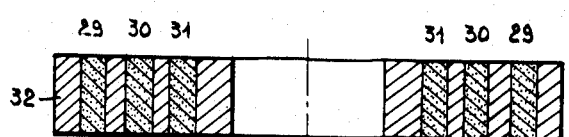
FIG. 2 is a cross-section according to lines a—a of FIG. 1, wherein the magnetic inserts pass completely through the disk of non-magnetic material.

In FIG. 2, an integral body 32 of copper or the like is shown with magnetic bars passing through and constituting the magnetic inserts, of iron or steel for instance. The disk of copper is drilled or otherwise perforated and the inserts are forced within the resulting holes. The inserts may be riveted for reenforcing the mechanical union with the disk.

Figure 3:
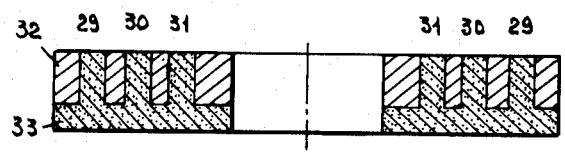
FIG. 3 is a sectional view of a modified armature member wherein said inserts are united by a rear continuous magnetic plate.

In FIG. 3, a magnetic disk 33 has been machined by any mechanical and/or chemical process, for presenting spikes or protrusions projecting from one face thereof and constituting the above-said inserts, and the space between the spikes and up to their front faces has been deposited, for instance by an electromechanical or electrochemical process, a conductive and non-magnetic material. Obviously the magnetic disk may carry spikes or protrusions on both faces thereof when required. This disk may be made of integral or solid material or may be made of a laminated structure in which case it may be formed, as said, by machining a spiralled magnetic ribbon disk.

The ratios of areas and volumes of the magnetic and non-magnetic materials in the armature member may be varied according to each required result and, for instance, said ratios may be made equal to unity.

As shown in FIGURE 1 of the drawing, the holes or cavities formed in the disc 32 for receiving the magnetic inserts are distributed in such manner that the inner and outer peripheral portions of the disc are free of cavities and constitute continuous conductive ring portions. Also, the holes or cavities are spacially distributed in a manner to provide a plurality of continuous metallic conductive paths extending generally radially from the inner conductive ring portion to the outer ring portion, and the spacial distribution of the holes or cavities is such that the linear configuration of each conductive path is different from the linear configurations of the immediately adjacent conductive paths. Also, as indicated above, the number of inserts included in any annular band of the disk, of a given radial width, increases with the radial distance of the band from the center of the disk. For example, the annular band which includes the inner circle of inserts 31 has only 15 inserts; the middle band of the disk which includes the middle circle of inserts 30 has 21 inserts; and the outer annular band of the disk incorporating the outer circle of inserts 29 has 27 inserts. As stated, such an arrangement provides a ratio of copper surface to iron surface which remains substantially the same for the different bands.

I claim:

1. A rotor for an electric motor of the axial airgap type comprising a metallic disk formed of electrically conductive but non-magnetic material and having a flat radial face, said disk having a plurality of cavities formed in an annular area of said face, and magnetic material inserts filling said cavities and having exposed areas which are flush with respect to said flat radial face, said cavities being distributed over said annular area to provide inner and outer peripheral portions which are free of cavities and constitute continuous conductive ring portions, said cavities being spacially distributed to provide a plurality of continuous metallic conductive paths on said face extending generally radially from the inner conductive ring portion of the disk to the outer conductive ring portion, the spacial distribution of the cavities being such that the linear configuration of each conductive path is different from the linear configuration of the immediately adjacent conductive paths, and the distribution of said inserts being such as to maintain a substantially constant ratio between the surface of said inserts and the exposed area of the disk face for different radial distances from the center of the disk.

2. A rotor according to claim 1, wherein said magnetic inserts are separate and their end faces are flush with said conductive material on both faces of the rotor.

3. A rotor according to claim 2, wherein the said inserts are riveted within the holes of a perforated disk formed of said conductive material.

4. A rotor according to claim 1, wherein said magnetic inserts are separate and are forced within holes formed within a disk of conductive material, said holes having a depth less than the thickness of said disk.

5. A rotor according to claim 1, wherein said magnetic inserts are integral with a magnetic disk in the rotor.

6. A rotor according to claim 5, wherein said magnetic disk constitutes one radial face of the rotor.

7. A rotor according to claim 5, wherein said magnetic disk is provided with inserts on both faces thereof and is embedded within the said conductive non-magnetic material.

8. A rotor according to claim 1, wherein the said magnetic inserts are distributed over the surface of the rotor in several circular arrays.

9. A rotor according to claim 8, wherein the numbers of inserts in the different circular arrays are not divisible by each other and are multiples of numbers which are not divisible by each other.

References Cited by the Examiner
UNITED STATES PATENTS

| 1,748,753 | 2/1930 | Bowie | 310—106 |
| 2,617,052 | 11/1952 | Bessiere | 310—105 |
| 2,929,946 | 3/1960 | Aske | 310—166 |

MILTON O. HIRSHFIELD, *Primary Examiner.*

ORIS L. RADER, *Examiner.*